UNITED STATES PATENT OFFICE 2,185,208

THIOCYANO-ALKYL ETHERS OF THE PHENYLPHENOLS

John E. Livak, Gerald H. Coleman, and Clarence L. Moyle, Midland, Mich., assignors to The Dow Chemical Company, Midland, Mich., a corporation of Michigan No Drawing. Application October 27, 1938, Serial No. 237,276

10 Claims. (Cl. 260—454)

The present invention relates to the thiocyano-alkyl ethers of the phenylphenols, and is particularly concerned with those new ether compounds having the following formula

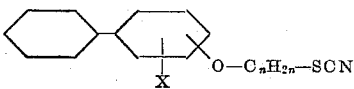

wherein $n$ represents an integer from 2 to 5, inclusive, and X represents a member of the group consisting of lower alkyl, chlorine, bromine, and hydrogen. These compounds are for the most part low-melting solids or viscous, high-boiling, water-white liquids, substantially insoluble in water and somewhat soluble in most petroleum distillate fractions and organic solvents generally. We have prepared representative members of this group of compounds and found that they are useful as insecticidal toxicants, particularly when dissolved in petroleum distillate fractions.

Our new compounds may be prepared by reacting a halo-alkyl ether of a phenylphenol or a nuclear substituted derivative thereof with an alkali metal thiocyanate in the presence of alcohol. For example, a suitable halo-alkyl ether and the inorganic thiocyanate are dispersed in absolute alcohol and the resulting mixture heated to its boiling temperature and under reflux for a period of time sufficient to accomplish reaction. The reaction temperature is generally between about 75° and 90° C., although somewhat lower or higher temperatures may be employed, the reaction being carried out under autogenous pressure where temperatures above the boiling point of the solution prevail. While any suitable proportions of the halo-alkyl ethers of the phenylphenol and the metal thiocyanate may be employed, substantially equi-molecular proportions thereof have been found to give the desired compounds in good yield. Following the reaction, the mixture is treated to isolate the thiocyano-alkyl ether of the phenol. This may be accomplished, for example, by fractionally distilling the reaction mixture to remove the major portion of the alcohol, diluting the residue with water, and extracting with benzene or ethylene chloride to recover the water-immiscible organic thiocyanate. The extracting solvent is then distilled out of the mixture to leave a crude ether product which may be employed as such for insecticidal purposes or, if desired, further purified as by fractional distillation.

The halo-alkyl ethers employed as reactants in the preparation of our new compounds may be prepared by reacting an alkali metal salt of a phenylphenol with an equimolecular proportion of an alkylene halide or poly-methylene halide under such conditions of temperature and pressure as favor the replacement of a single halogen atom by the phenyl-phenoxy group. The halo-alkyl ether of the phenylphenol is thereafter separated from the reaction mixture as by fractional distillation. Co-pending applications Serial Nos. 90,380, filed July 13, 1936 and 139,581, filed April 28, 1937, by Coleman et al. describe the preparation and properties of a number of these halo-alkyl ether compounds.

The following examples disclose in detail the preparation of certain compounds falling within the scope of our invention, but are not to be construed as limiting the same:

Exampe 1

99 grams (0.4 mol) of gamma-chloro-propyl ether of 2-phenylphenol (boiling point 147° to 149° C. at 3 millimeters pressure), 30 grams (0.4 mol) of potassium thiocyanate, and 300 milliliters of absolute alcohol were mixed together and heated at 79°–81° C. and under reflux for 48 hours. The mixture was then fractionally distilled to remove a major proportion of the alcohol, and the distillation residue poured into an excess of water with stirring, whereby a water-immiscible oil was separated. This oil was taken up by extraction of the benzene, and the extract dried and fractionally distilled, whereby there was obtained 50 grams (0.2 mol) of gamma-thiocyano-propyl ether of 2-phenylphenol as a water-white liquid boiling at 198° to 200° C. at 2 millimeters pressure and having a specific gravity of 1.158 at 20°/4° C. A 3 per cent solution of this compound in kerosene, when tested by the Peet-Grady method, substantially as described in Soap, 8, No. 4, 1932, gave a knockdown of 100 per cent in 10 minutes and a kill of 88 per cent in 48 hours against three-day old house flies.

Example 2

In a similar manner, equimolecular proportions of beta-bromo-ethyl ether of 3-phenylphenol (boiling point 190°–192° C. at 4 millimeters pressure) and potassium thiocyanate were reacted together in alcohol dispersion, whereby there was obtained 68.6 per cent yield of the beta-thiocyano-ethyl ether of 3-phenylphenol as a viscous liquid boiling at 207°–212° C. at 2 millimeters pressure. A 3 per cent solution of this compound in kerosene, when tested by the Peet-Grady method, gave a knockdown of 100 per cent in 10 minutes and a kill of 76 per cent in 48 hours against three-day old house flies.

Example 3

100 grams (0.32 mol) of beta-bromo-ethyl ether of 2-phenyl-4-chloro-phenol (boiling at 184° to 187° C. at 6.3 millimeters pressure), 31 grams (0.32 mol) of potassium thiocyanate, and 125 milliliters of absolute alcohol were mixed together and refluxed with stirring for 11 hours. The reaction mixture was then cooled to room temperature and poured into 1 liter of water to precipitate a water-immiscible oil. This oil was recovered by extraction with ethylene bromide and the extract fractionally distilled, whereby there was obtained 39.2 grams of a beta-thiocyano-ethyl ether of 2-phenyl-4-chloro-phenol fraction boiling at 218° to 221° C. at 6 millimeters pressure. This compound is a viscous, yellow oil having a specific gravity of 1.258 at 25°/4° C. and containing 12.45 per cent by weight of chlorine by analysis as compared to a theoretical chlorine content of 12.3 per cent.

Example 4

71.0 grams (0.21 mol) of the beta-bromo-ethyl ether of 2-phenyl-4-tertiarybutyl phenol (boiling at 210°–215° C. at 8.6 millimeters pressure), 20.7 grams (0.214 mol) of potassium thiocyanate, and 100 milliliters of absolute alcohol were reacted together substantially as described in Example 3. Fractional distillation of the crude reaction mixture yielded 25.4 grams of the beta-thiocyano-ethyl ether of 2-phenyl-4-tertiarybutyl phenol as a viscous oil boiling at 225° to 230° C. at 5.3 millimeters pressure and having a specific gravity of 1.11 at 25°/4° C.

In a similar manner, other halo-alkyl ethers of the phenylphenols were reacted with the alkali metal thiocyanates to obtain representative organic thiocyanates as follows:

Beta-thiocyano-ethyl ether of 2-phenylphenol, by the reaction of potassium thiocyanate with the beta-bromo-ethyl ether of 2-phenylphenol (melting point 67° C.). This compound is a colorless oil boiling at 182° to 186° C. at 3 millimeters pressure and having a specific gravity of 1.191 at 20°/4° C. A 3 per cent solution of the beta-thiocyano-ethyl ether of 2-phenylphenol in kerosene, when tested by the Peet-Grady method, gave a knockdown in 10 minutes of 89 per cent and a kill in 48 hours of 68 per cent against three-day old house flies.

Gamma-thiocyano-propyl ether of 3-phenylphenol, by the reaction of gamma-bromo-propyl ether of 3-phenylphenol (boiling point 200° to 205° C. at 4 millimeters pressure) with potassium thiocyanate. This thiocyano-alkyl ether is a colorless oil boiling at 243° to 246° C. at 5 millimeters pressure. A 3 per cent solution of this compound in kerosene, when tested as described in the foregoing examples, gave a knockdown in 10 minutes of 92 per cent and a kill in 48 hours of 74 per cent.

Beta-thiocyano-ethyl ether of 4-phenylphenol, by the reaction of beta-bromo-ethyl ether of 4-phenylphenol (melting point 114° C.) with potassium thiocyanate. This organic thiocyanate is a white, crystalline solid melting at 100° to 102° C.

Other halo-alkyl ethers of the phenylphenols which may be reacted with the alkali metal thiocyanates, substantially as described in the foregoing examples to produce valuable compounds, are beta-chloro-ethyl ether of 2-phenylphenol, boiling at 174° to 176° C. at 10 millimeters pressure; beta-chloro-ethyl ether of 3-chlorophenylphenol, boiling at 179° to 181° C. at 5 millimeters pressure; beta-chloro-ethyl ether of 4-phenylphenol, boiling at 163° to 165° C. at 3 millimeters pressure; gamma-chloro-isobutyl ether of 2-phenylphenol boiling at 170° to 173° C. at 5 millimeters pressure; beta-chloro-ethyl ether of 2-phenyl-4-chloro-phenol, boiling at 149° to 150° C. at 3 millimeters pressure; beta-chloro-ethyl ether of 2-phenyl-4-isopropyl phenol, boiling at 150° to 153° C. at 2 millimeters pressure; beta-chloro-ethyl ether of 2-bromo-4-phenylphenol; beta-bromo-ethyl ether of 2-methyl-4-phenylphenol; beta-chloro-propyl ether of 2-phenylphenol; chloro-pentyl ether of 3-phenylphenol; and the like.

We claim:

1. A compound having the formula

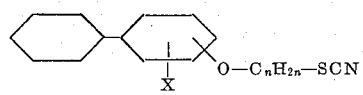

wherein $n$ represents an integer from 2 to 5, inclusive, and X represents a member of the group consisting of chlorine, bromine, lower alkyl, and hydrogen.

2. A compound having the formula

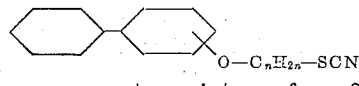

wherein $n$ represents an integer from 2 to 5, inclusive.

3. A compound having the formula

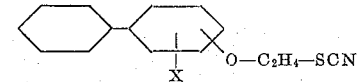

wherein X represents a member of the group consisting of chlorine, bromine, lower alkyl, and hydrogen.

4. A compound having the formula

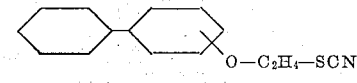

5. A compound having the formula

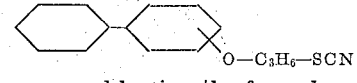

6. A compound having the formula

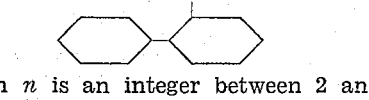

wherein $n$ is an integer between 2 and 5, inclusive.

7. A compound having the formula

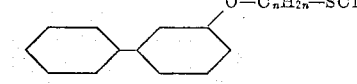

wherein $n$ is an integer between 2 and 5, inclusive.

8. Beta-thiocyano-ethyl ether of 3-phenylphenol.

9. Gamma-thiocyano-propyl ether of 2-phenylphenol.

10. Gamma-thiocyano-propyl ether of 3-phenylphenol.

JOHN E. LIVAK.
GERALD H. COLEMAN.
CLARENCE L. MOYLE.